US011948023B2

(12) United States Patent
Ghafourifar et al.

(10) Patent No.: US 11,948,023 B2
(45) Date of Patent: Apr. 2, 2024

(54) AUTOMATIC APPLICATION PROGRAM INTERFACE (API) SELECTOR FOR UNSUPERVISED NATURAL LANGUAGE PROCESSING (NLP) INTENT CLASSIFICATION

(71) Applicant: Entefy Inc., Palo Alto, CA (US)

(72) Inventors: Alston Ghafourifar, Los Altos Hills, CA (US); Mehdi Ghafourifar, Los Altos Hills, CA (US); Brienne Ghafourifar, Los Altos Hills, CA (US)

(73) Assignee: Entefy Inc., Palo Alto, CA (US)

( * ) Notice: Subject to any disclaimer, the term of this patent is extended or adjusted under 35 U.S.C. 154(b) by 157 days.

(21) Appl. No.: 16/889,613

(22) Filed: Jun. 1, 2020

(65) Prior Publication Data

US 2021/0089375 A1   Mar. 25, 2021

Related U.S. Application Data

(63) Continuation of application No. 15/859,183, filed on Dec. 29, 2017, now abandoned.

(51) Int. Cl.
*G06F 9/54* (2006.01)
*G06F 9/451* (2018.01)
*G06F 40/30* (2020.01)

(52) U.S. Cl.
CPC ............ *G06F 9/547* (2013.01); *G06F 9/453* (2018.02); *G06F 9/543* (2013.01); *G06F 40/30* (2020.01)

(58) Field of Classification Search
None
See application file for complete search history.

(56) References Cited

U.S. PATENT DOCUMENTS 5,481,597 A   1/1996   Given
5,951,638 A   9/1999   Hoss (Continued)

FOREIGN PATENT DOCUMENTS

WO    9931575        6/1999
WO    2013112570 A1  8/2013

OTHER PUBLICATIONS

Guangyi Xiao et al., "User Interoperability With Heterogeneous IoT Devices Through Transformation," pp. 1486-1496, 2014.

*Primary Examiner* — Chat C Do
*Assistant Examiner* — William C Wood
(74) *Attorney, Agent, or Firm* — Haynes and Boone, LLP

(57) ABSTRACT

Improved intelligent personal assistant (IPA) software agents are disclosed that are configured to interact with various people, service providers, files, and/or smart devices. More particularly, this disclosure relates to an improved Natural Language Processing (NLP) Intent Determination Service (IDS) that is able to determine the likely best action to take in response to generic user commands and queries. The disclosed NLP IDS automatically selects valid (or potentially valid) API paths (e.g., sequence of API calls) to produce desired actions. Associated system actions and known API sequencing rules may then be used to process the incoming user command or query. A feedback loop is also disclosed to identify newly available APIs and success criteria for selected API paths. Discovery of API paths may be performed using predefined information, monitored information, programmatically determined interfaces, and programmatically tested interfaces. A directed graph model may be used to represent potential API paths.

20 Claims, 9 Drawing Sheets

(56) References Cited

U.S. PATENT DOCUMENTS

| | | | |
|---|---|---|---|
| 6,101,320 A | 8/2000 | Schuetze | |
| 6,950,502 B1 | 9/2005 | Jenkins | |
| 7,450,937 B1 | 11/2008 | Claudatos | |
| 7,673,327 B1 | 3/2010 | Polis | |
| 7,886,000 B1 | 2/2011 | Polis | |
| 7,908,647 B1 | 3/2011 | Polis | |
| 8,090,787 B2 | 1/2012 | Polis | |
| 8,095,592 B2 | 1/2012 | Polis | |
| 8,108,460 B2 | 1/2012 | Polis | |
| 8,112,476 B2 | 2/2012 | Polis | |
| 8,122,080 B2 | 2/2012 | Polis | |
| 8,156,183 B2 | 4/2012 | Polis | |
| 8,281,125 B1 | 10/2012 | Briceno | |
| 8,296,360 B2 | 10/2012 | Polis | |
| 8,433,705 B1 | 4/2013 | Dredze | |
| 8,438,223 B2 | 5/2013 | Polis | |
| 8,458,256 B2 | 6/2013 | Polis | |
| 8,458,292 B2 | 6/2013 | Polis | |
| 8,458,347 B2 | 6/2013 | Polis | |
| 8,468,202 B2 | 6/2013 | Polis | |
| 8,954,988 B1* | 2/2015 | Laredo | G06F 9/54 719/310 |
| 8,959,156 B2 | 2/2015 | Polis | |
| 2002/0133509 A1 | 9/2002 | Johnston | |
| 2002/0152091 A1 | 10/2002 | Nagaoka | |
| 2002/0178000 A1 | 11/2002 | Aktas | |
| 2002/0194322 A1 | 12/2002 | Nagata | |
| 2004/0117507 A1 | 6/2004 | Torma | |
| 2004/0137884 A1 | 7/2004 | Engstrom | |
| 2004/0243719 A1 | 12/2004 | Roselinsky | |
| 2004/0266411 A1 | 12/2004 | Galicia | |
| 2005/0015443 A1 | 1/2005 | Levine | |
| 2005/0080857 A1 | 4/2005 | Kirsch | |
| 2005/0198159 A1 | 9/2005 | Kirsch | |
| 2006/0041423 A1* | 2/2006 | Kline | G06F 11/3676 704/9 |
| 2006/0193450 A1 | 8/2006 | Flynt | |
| 2007/0054676 A1 | 3/2007 | Duan | |
| 2007/0130273 A1 | 6/2007 | Huynh | |
| 2007/0237135 A1 | 10/2007 | Trevallyn-Jones | |
| 2008/0062133 A1 | 3/2008 | Wolf | |
| 2008/0088428 A1 | 4/2008 | Pitre | |
| 2008/0261569 A1 | 10/2008 | Britt | |
| 2009/0016504 A1 | 1/2009 | Mantell | |
| 2009/0119370 A1 | 5/2009 | Stern | |
| 2009/0177744 A1 | 7/2009 | Marlow | |
| 2009/0181702 A1 | 7/2009 | Vargas | |
| 2009/0271486 A1 | 10/2009 | Ligh | |
| 2009/0292814 A1 | 11/2009 | Ting | |
| 2009/0299996 A1 | 12/2009 | Yu | |
| 2010/0057872 A1 | 3/2010 | Koons | |
| 2010/0210291 A1 | 8/2010 | Lauer | |
| 2010/0220585 A1 | 9/2010 | Poulson | |
| 2010/0229107 A1 | 9/2010 | Turner | |
| 2010/0323728 A1 | 12/2010 | Gould | |
| 2010/0325227 A1 | 12/2010 | Novy | |
| 2011/0051913 A1 | 3/2011 | Kesler | |
| 2011/0078247 A1 | 3/2011 | Jackson | |
| 2011/0130168 A1 | 6/2011 | Vendrow | |
| 2011/0194629 A1 | 8/2011 | Bekanich | |
| 2011/0219008 A1 | 9/2011 | Been | |
| 2012/0016858 A1 | 1/2012 | Rathod | |
| 2012/0209847 A1 | 8/2012 | Rangan | |
| 2012/0210253 A1 | 8/2012 | Luna | |
| 2012/0221962 A1 | 8/2012 | Lew | |
| 2013/0018945 A1 | 1/2013 | Vendrow | |
| 2013/0024521 A1 | 1/2013 | Pocklington | |
| 2013/0097279 A1 | 4/2013 | Polis | |
| 2013/0151508 A1 | 6/2013 | Kurabayashi | |
| 2013/0262852 A1 | 10/2013 | Roeder | |
| 2013/0267264 A1 | 10/2013 | Abuelsaad | |
| 2013/0304830 A1 | 11/2013 | Olsen | |
| 2013/0332308 A1 | 12/2013 | Linden | |
| 2014/0270131 A1 | 9/2014 | Hand | |
| 2014/0280460 A1 | 9/2014 | Nemer | |
| 2014/0297807 A1 | 10/2014 | Dasgupta | |
| 2015/0039887 A1 | 2/2015 | Kahol | |
| 2015/0186455 A1 | 7/2015 | Horling | |
| 2015/0278370 A1 | 10/2015 | Stratvert | |
| 2015/0281184 A1 | 10/2015 | Cooley | |
| 2015/0286747 A1 | 10/2015 | Anastasakos | |
| 2015/0286943 A1 | 10/2015 | Wang | |
| 2016/0057207 A1* | 2/2016 | Li | H04N 21/4431 709/203 |
| 2016/0087944 A1 | 3/2016 | Downey | |
| 2016/0379136 A1 | 12/2016 | Chen | |
| 2017/0220963 A1* | 8/2017 | Canaran | G06F 3/0484 |
| 2017/0286155 A1* | 10/2017 | Hosabettu | G06Q 10/063114 |

* cited by examiner

AUTOMATIC APPLICATION PROGRAM INTERFACE (API) SELECTOR FOR UNSUPERVISED NATURAL LANGUAGE PROCESSING (NLP) INTENT CLASSIFICATION

CROSS-REFERENCE TO RELATED APPLICATION

This application is a continuation of U.S. patent application Ser. No. 15/859,183, filed Dec. 29, 2017, which is related to the commonly-assigned and non-provisional patent application having U.S. patent application Ser. No. 15/396,503, filed Dec. 31, 2016, and entitled "Distributed Natural Language Message Interpretation Engine" (hereinafter, "the '503 application"), now issued U.S. Pat. No. 10,491,690, all of which are hereby incorporated by reference in their entirety.

TECHNICAL FIELD

This disclosure relates generally to apparatuses, methods, and computer readable media for improved natural language processing (NLP) intent determination, e.g., for use with intelligent personal assistant software agents that are configured to interact with people, services, and devices across multiple communications formats and protocols.

BACKGROUND

Intelligent personal assistant (IPA) software systems comprise software agents that can perform various tasks or services on behalf of an individual user. These tasks or services may be based on a number of factors, including: spoken word or verbal input from a user, textual input from a user, gesture input from a user, a user's geolocation, a user's preferences, a user's social contacts, and an ability to access information from a variety of online sources, such as via the World Wide Web. However, current IPA software systems have fundamental limitations in natural language processing, natural language understanding (NLU), and so-called "intent determination" in practical applications.

For example, in some systems, language context and action possibilities gleaned from user commands may be constrained 'up front' by identifying the specific service that the user is sending the command to before attempting to perform any NLP/NLU—thus increasing the accuracy of results and significantly reducing the amount of processing work needed to understand the commands. However, this strategy may not provide a satisfactory user experience in the context of AI-enabled IPAs, wherein the user may often engage in macro-level 'conversations' with his or her device via a generic query to a single IPA 'persona' that is capable of interacting with many third-party services, APIs, file, document, and/or systems. In such situations, it becomes more complex and challenging for the IPA to reliably direct the user's commands to the appropriate data, interface, third-party service, etc.—especially when a given command may seemingly apply with equal validity to two or more known third-party interfaces or services that the IPA software agent is capable of interfacing with. For example, the command, "Send {item}." may apply with seemingly equal validity to a native text messaging interface, a native email client, a third-party messaging interface, a flower delivery service, etc.

Moreover, it is quite computationally expensive to attempt to parse the grammar of each incoming user command or query 'up front,' i.e., to attempt to determine the intent of the user's command and/or which specific services, APIs, file, document, or system the user intends for his command to be directed to. Computationally-expensive parsing may also be used to determine how certain words or phrases in the user's command depend on, relate to, or modify other words or phrases in the user's command, thereby giving the system a greater understanding of the user's actual intent.

NLP systems may be used to attempt to glean the true intent of a user's commands, but the success of such systems is largely dependent upon the training set of data which has been used to train the NLP system. NLP also requires computationally-intensive parsing to determine what parts of the user's command refer to intents, which parts refer to entities, which parts refer to attributes, etc., as well as which entities and attributes are dependent upon (or are modifying) which intents.

The subject matter of the present disclosure is directed to overcoming, or at least reducing the effects of, one or more of the problems set forth above. To address these and other issues, techniques that enable a more computationally-efficient selection of APIs based on NLP intent classification are described herein.

DETAILED DESCRIPTION

Improved intelligent personal assistant (IPA) software agents are disclosed that are configured to interact with various people, service providers, files, and/or smart devices. More particularly, this disclosure relates to an improved Natural Language Processing (NLP) Intent Determination Service (IDS) that is able to determine the likely best action to take in response to generic user commands and queries. The disclosed NLP IDS automatically selects valid (or potentially valid) API paths (e.g., sequence of API calls) to produce desired actions. Associated system actions and known API sequencing rules may then be used to process the incoming user command or query. A feedback loop is also disclosed to identify newly available APIs and success criteria for selected API paths. Discovery of API paths may be performed using predefined information, monitored information, programmatically determined interfaces, and programmatically tested interfaces. A directed graph model may be used to represent potential API paths.

In some embodiments, disclosed techniques improve a user's interaction with applications and devices (e.g., the user experience). More particularly, some embodiments of this disclosure are directed to an infrastructure to support automatic API selection for unsupervised NLP intent classification. The disclosed infrastructure (e.g., via generating an accurate API sequence in response to a natural language command) causes actions matching the intent of the user to be performed on one or more computer systems. The infrastructure may then apply techniques such as machine learning algorithms to incorporate feedback from both successful and unsuccessful sequences to improve future processing. For example, a scoring system may be used to calculate preferred API sequences. Using scoring values may allow for optimization of those values for a particular action. Monitoring of actions to build and refine a model of API sequences may be performed in the computer at different levels of the software/hardware hierarchy (see FIG. 4). In this manner, applications may be automatically participating in the discovery and maintenance of possible API paths without any modifications. Clearly, although not required, applications may be designed with knowledge of the disclosed improvements and provide interfaces to interact directly with the disclosed infrastructure to report on API sequences.

Figure 1:
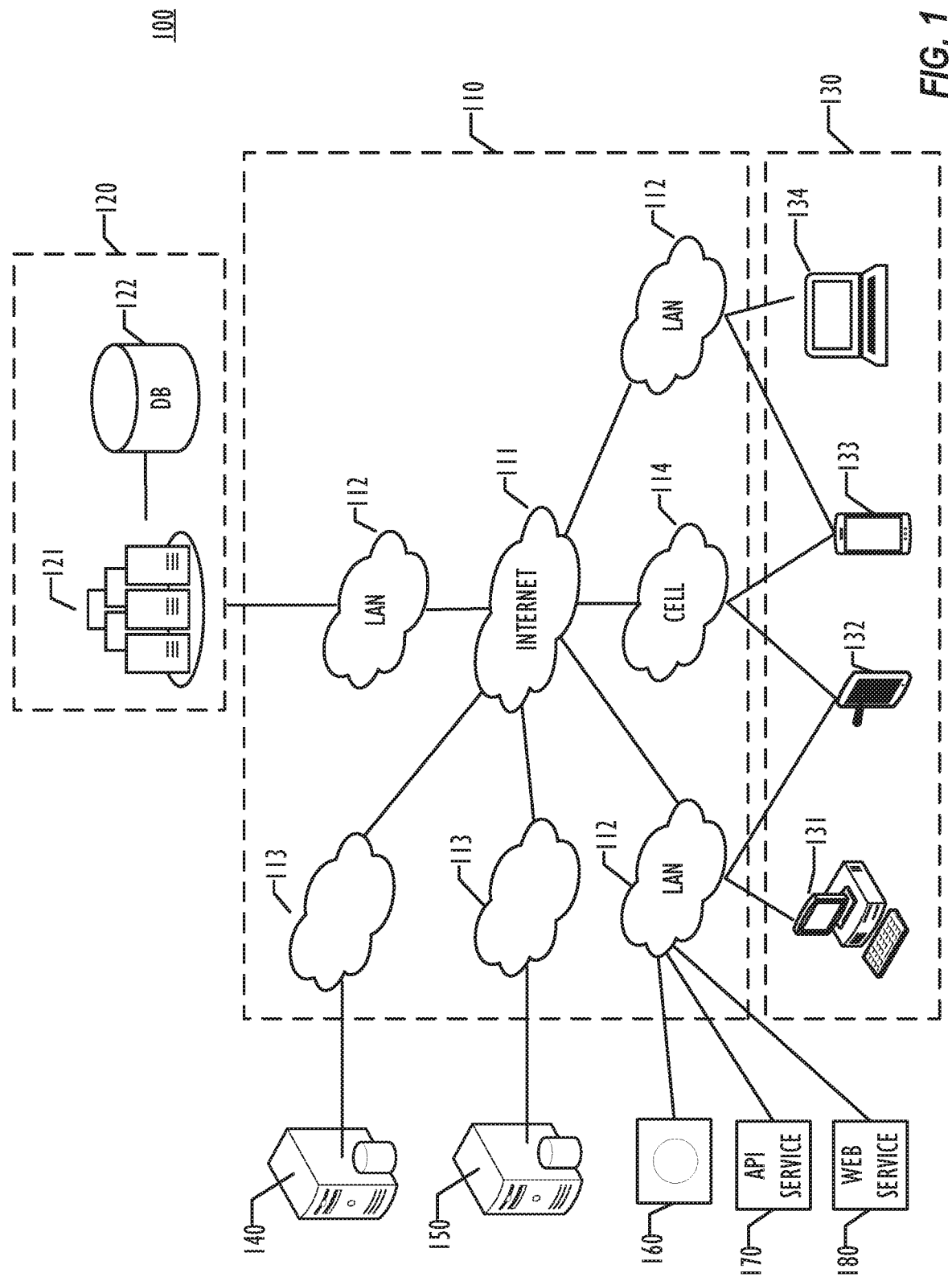
FIG. 1 is a block diagram illustrating a network architecture infrastructure 100, according to one or more disclosed embodiments.

Referring now to FIG. 1, a network architecture infrastructure 100 is shown schematically. Infrastructure 100 includes computer networks 110, server configuration 120 (e.g., devices implementing an automatic API selector for unsupervised NLP intent classification according to one or more disclosed embodiments), client devices 130, third-party communications devices 140, third-party service provider devices 150, smart devices 160, third-party 'API-enabled' services 170, and third-party 'Web-enabled' services 180. Note that devices may be either physical or virtualized and may run on dedicated hardware or exist dynamically in the cloud.

The computer networks 110 may include any communications network that allows computers to exchange data, such as the interne 111, local area networks 112, corporate networks 113, cellular communications networks 114, etc. Each of the computer networks 110 may operate using any number of network protocols (e.g., TCP/IP). The computer networks 110 may be connected to each other and to the various computing devices described herein (e.g., the interaction platform devices of server configuration 120, the client devices 130, the third-party communications devices 140, the third-party service provider devices 150, the smart devices 160, the third-party 'API-enabled' services 170, and the third-party 'Web-enabled' services 180) via hardware elements such as gateways and routers (not shown).

Interaction platform devices of server configuration 120 may include one or more servers 121 and one or more storage devices 122. The one or more servers 121 may include any suitable computer hardware and software configured to provide the features disclosed herein. Storage devices 122 may include any tangible computer-readable storage media including, for example, read-only memory (ROM), random-access memory (RAM), magnetic disc storage media, optical storage media, solid state (e.g., flash) memory, etc.

Client devices 130 may include any number of computing devices that enable an end user to access the features disclosed herein. For example, client devices 130 may include, for example, desktop computers 131, tablet computers 132, mobile phone 133, notebook computers 134, etc.

Third-party communications devices 140 may include email servers such as a GOOGLE® email server (GOOGLE is a registered service mark of Google Inc.), third-party instant message servers such as an Instant Messaging (IM) server, third-party social network servers such as a FACEBOOK® or TWITTER® server (FACEBOOK is a registered trademark of Facebook, Inc. TWITTER is a registered service mark of Twitter, Inc.), cellular service provider servers that enable the sending and receiving of messages such as email messages, short message service (SMS) text messages, multimedia message service (MMS) messages, or any other device that enables individuals to communicate using any protocol and/or format.

Third-party service devices 150 may include any number of computing devices that enable an end user to request one or more services via network communication. For example, cloud-based software as a service (SAAS) or platform as a service (PAAS) providers and the applications they make available via the cloud. Smart devices 160 may include any number of hardware devices that communicate via any of the computer networks 110 and are capable of being controlled via network communication. Third-party 'API-enabled' services 170 may include any number of services that communicate via any of the computer networks 110 and are capable of being controlled via an Application Programming Interface (API), such as a ride-sharing service. Third-party 'Web-enabled' services 180 may include any number of services that may have no direct third-party interface, other than informational content, e.g., information hosted on a third-party web site or the like, such as a train schedule.

The disclosed conversationally aware server configuration 120, therefore, can represent improvements to computer functionality. For example, the advantages of an automatic API selection for unsupervised NLP intent classification described herein can assist with enabling users to better interact with computers using a conversationally aware interface (e.g., voice commands, or conversationally structured commands such as questions or requests). This more efficient and more accurate association of a user's intent to possible API functions may also result in a reduction to run-time processing of commands and make overall communication between human and machine more efficient. That is, an automatic API selection for unsupervised NLP intent classification system may assist with reducing wasted computational resources (e.g., computational resources that would otherwise not be necessary due to inefficient communications, etc.). The disclosed server configuration 120 may also integrate information from one or more of the many system users to continuously improve model accuracy. For example, the model (e.g., directed graph for API possibilities and probabilities discussed with reference to FIG. 5 below) may be updated as a result of activities on user systems to reflect newly discovered APIs and success factors of API paths. Newly discovered APIs may include web services or other network based functions that may be made available on an ongoing basis. As described in further detail below, at least one embodiment of an automatic API selection for unsupervised NLP intent classification system can be implemented using software, hardware, or a combination thereof.

Figure 2A:
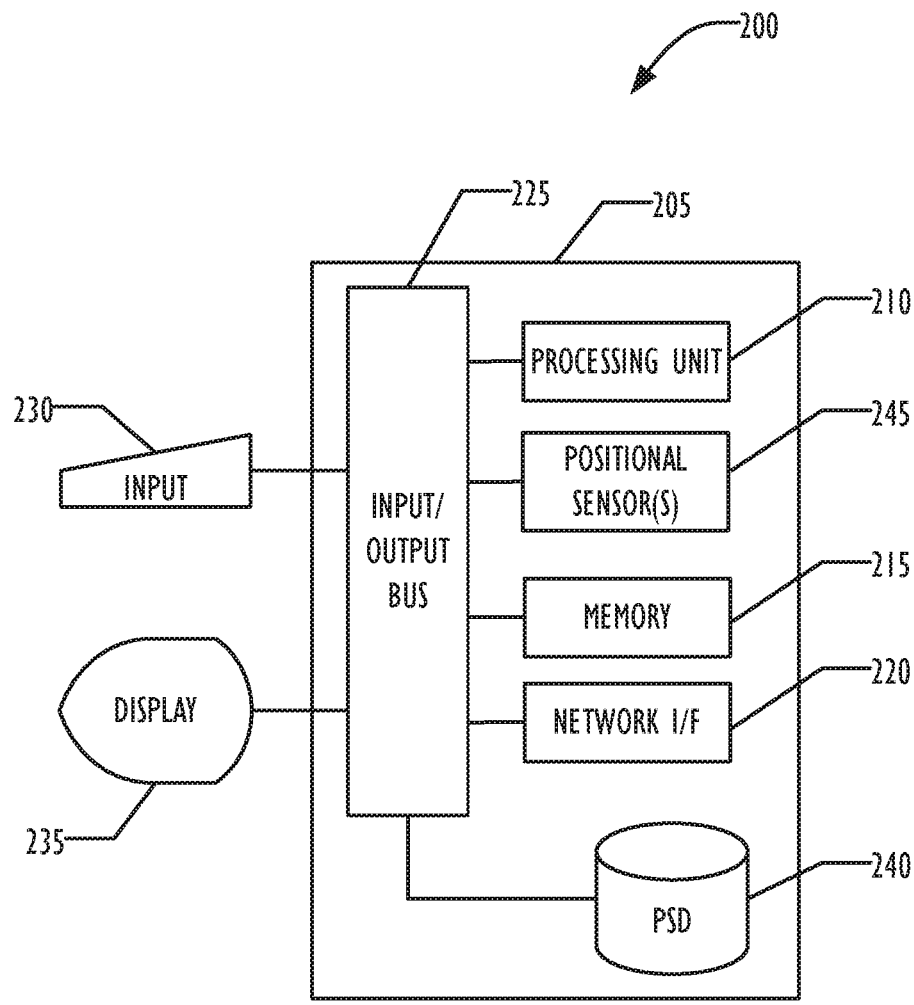
FIG. 2A is a block diagram illustrating a computer 200, which could be used to execute the various processes described herein, according to one or more disclosed embodiments.

Referring now to FIG. 2A, an example processing device 200 for use in the different hardware components that may be used to implement one or more disclosed embodiments is illustrated in block diagram form. Processing device 200 may serve in, e.g., a server 121 or a client device 130. Example processing device 200 comprises a system unit 205 which may be optionally connected to an input device 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like, and which may be used to track the movement of user client devices.

Figure 2B:
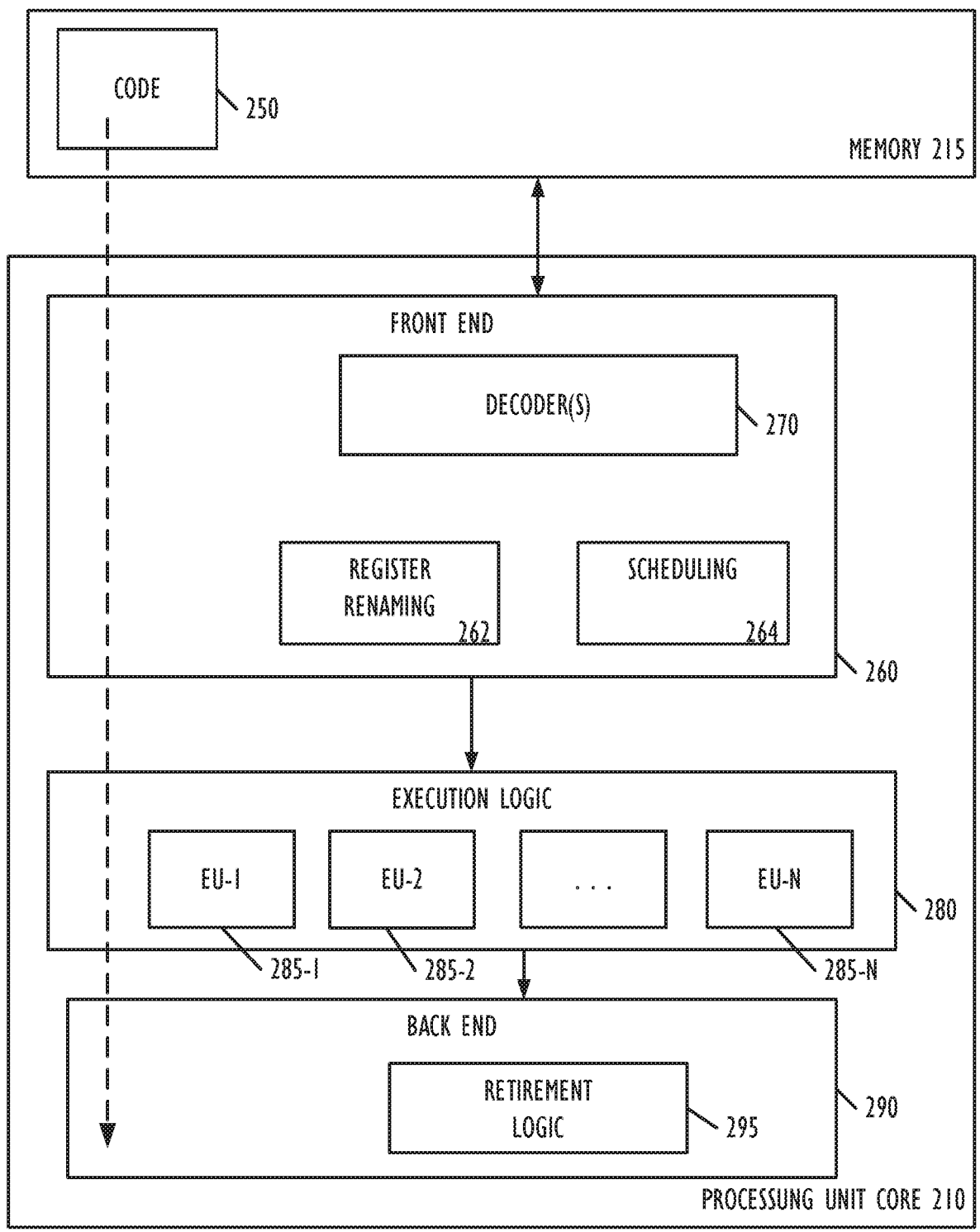
FIG. 2B is a block diagram illustrating a processor core 210, which may reside on a computer such as computer 200, according to one or more disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Figure 3:
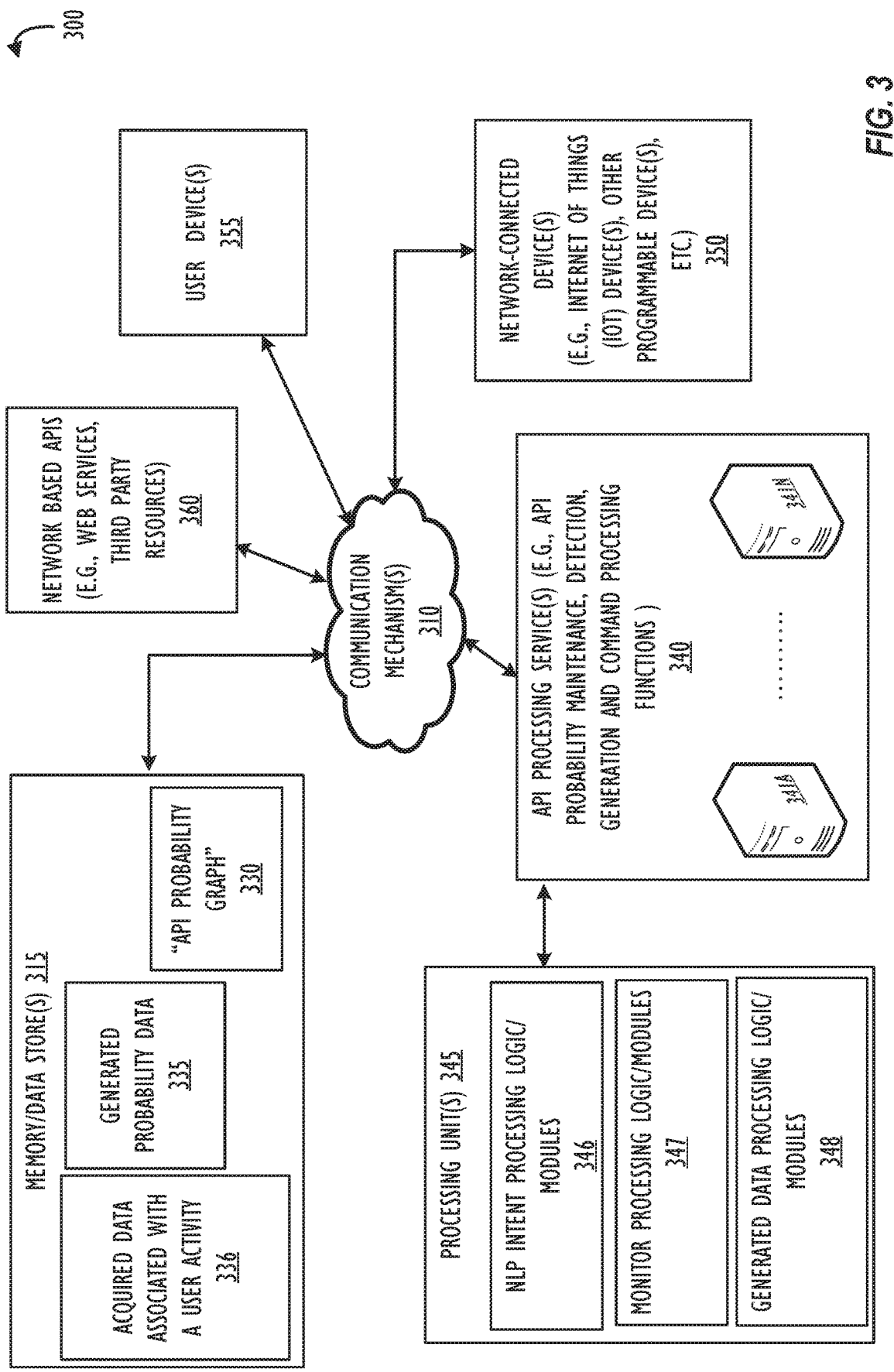
FIG. 3 is a block diagram 300 illustrating components of an example server configured as an API processing service 340 communicatively coupled to other devices through a network, according to one or more disclosed embodiments.

Referring now to FIG. 3 which illustrates, in block diagram form, an exemplary communications server infrastructure 300 configured to perform intent classification and API selection, according to one or more embodiments disclosed herein. Server infrastructure 300 may be implemented in a similar manner to server configuration 120 and used to support an automatic API selection for unsupervised NLP intent classification system as described herein. The listed server and database components represent a non-limiting set of examples that may be used to receive monitored events, perform NLP intent processing, provide correlation and analysis, and determine potential API logic paths in response to natural language commands, according to one or more disclosed embodiments. Within block 346, for example, machine learning techniques may be implemented on the one or more servers (e.g., 121 or 341A-N). Various machine learning algorithms may be used either individually or in combination and include, support vector machines (SVMs) and attribute clustering using KNN (K-Nearest Neighbor) algorithms. For one embodiment, server infrastructure 300 may include processing unit(s)

345, memory or data store(s) 315, network based APIs 360 e.g., from third (3rd) party service provider(s), user device(s) 355, communication mechanisms 310, API processing service 340, and network-connected device(s) 350. For one embodiment, one or more components in server infrastructure 300 may be implemented as one or more integrated circuits (ICs). For example, at least one of processing unit(s) 345, communication mechanism(s) 310, network based APIs 360, user devices 355, network-connected device(s) 350, or memory 315 can be implemented as a system-on-a-chip (SoC) IC, a three-dimensional (3D) IC, any other known IC, or any known IC combination. For another embodiment, two or more components in architecture 300 are implemented together as one or more ICs. Each component of architecture 300 is described below. API processing service 340 includes one or more computer devices 341A through 341N configured to perform the functions described herein for determining possible API sequences, maintaining API probability graph 330, collecting acquired data 336, generating the generated probability data 335, determining user intent from natural language inputs, and receiving feedback from external devices.

Processing unit(s) 345 can include, but are not limited to, central processing units (CPUs), graphical processing units (GPUs), other integrated circuits (ICs), memory, and/or other electronic circuitry. For one embodiment, processing unit(s) 345 manipulates and/or processes data (e.g., data associated with user commands, data associated with API sequences, data comprising feedback from operations resulting from natural language command processing, data associated with processing operations/algorithms/techniques, etc.). Processing unit(s) 345 may include: NLP intent processing logic/modules 346 for servicing commands received as natural language requests or queries; monitor processing logic/modules 347 for collecting, receiving, and processing information observed on user devices 355; and generated data processing logic/modules 348 for collecting and analyzing generated test sequences and other programmatically determined information, in accordance with one or more embodiments. For one embodiment, NLP intent processing logic/modules 346, monitor processing logic/modules 347, and/or generated data processing logic/modules are implemented as hardware (e.g., electronic circuitry associated with processing unit(s) 345, circuitry, dedicated logic, etc.), software (e.g., one or more instructions associated with a computer program executed by Processing unit(s) 345, software run on a general-purpose computer system or a dedicated machine, etc.), or a combination thereof.

Processing logic/modules 346, 347, and 348 can be employed in cooperation with one or more API processing service(s) 340 and an API probability graph 330 to perform tasks on behalf of users. Processing logic/modules 346, 347, and 348 may be part of a computing system (e.g., a laptop, server, a virtual machine, a programmable device, any other type of computing system, etc.) capable of processing user messages. User commands can be provided to architecture 300 in the form of user inputs in natural language encoded to be sent across a communication network to provide an input to API processing service 340. Natural language inputs may be received from a user device 355 over a network via communications mechanisms 310. Further, data from network based APIs and network connected devices 350 may also be made available via communication mechanisms 310. Information regarding network based APIs 360 and natural language commands (and their processing results) may be used to form or add to an API selection criteria as maintained in API probability graph 330 to assist with implementation of embodiments as disclosed herein.

API processing service 340 can obtain or receive any type of data associated with servicing user natural language interaction with computer systems and API sequencing. This data includes digitalized data representing one or more activities associated with a user account. The data can, for example, also include data stored in memory/data store(s) 315. For one embodiment, and as shown in FIG. 3, this data can include acquired data 336 and/or generated probability data 335. As used herein, "acquired data" refers to data collected as a result of monitoring API sequences to determine valid and preferred API paths. The data can optionally also include generated probability data 330, which refers to data resulting from processing definitional data or data associated with generated test sequences of API paths. One difference between acquired data 336 and generated probability data 335 is that the acquired data 336 represents "hard data." That is, acquired data 336 is known with a high degree of certainty, such as records of past activities or a record of current activity. On the other hand, generated probability data 335 may be considered "soft data." That is, generated probability data 335 includes data with a lower degree of certainty until actually used in a successful command sequence and includes data mined and processed with machine learning techniques. For one embodiment, generated probability data 335 represents the result of performing at least one of the following: (i) analyzing published API inputs and outputs to correlate potential API sequences; (ii) processing a definitional criteria describing API capabilities; (iii) applying logical rules to the generated probability data 335 or acquired data 336; (iv) programmatically testing API paths to determine success or failure of generated API paths; or (v) any other known methods used to infer new information from generated or acquired information. For example, acquired data 336 may include an actual API sequence performed on a monitored system by a user (with or without NLP capabilities), while generated data 335 may include predictions about how APIs might interrelate with each other.

Referring again to FIG. 3, API processing service 340 uses acquired data 336 and/or generated probability data 335 to generate and maintain API probability graph 330. As shown in FIG. 3, all or some of API probability graph 330 can be stored or acted upon by processing unit(s) 345, memory 315, and/or the service(s) 340. As used herein, an "API probability graph," a "directed API sequence graph" and their variations refer to a multi-dimensional, dynamically organized collection of data used by message processing service 340 for deductive reasoning. For one embodiment, API probability graph 330 acts as a knowledge based system that includes a knowledge base and/or an inference engine for a neural network. Consequently, API probability graph 330 represents a dynamic resource that has the capacity to "learn" as new information (e.g., acquired data 336, generated data 335, etc.) or new functional capabilities (e.g., API methods) are added. API probability graph 330, as a knowledge based system of a neural network, enables more than accessing information and extrapolating data for inferring or determining additional data—it can also be used for classification (e.g., pattern and sequence recognition, novelty detection, sequential decision making, etc.); and data processing (e.g., filtering, clustering, blind source separation and compression, etc.). As used herein, a "dimension" refers to an aspect upon which APIs may be related, classified, or organized. A dimension can be based on monitored information, feedback information, definitional information, or programmatically generated information.

API probability graph 330 may include multiple nodes and edges. Each node can represent one or more units of data (e.g., an API or combined sequence of APIs). Each edge (which may or may not be weighted) can represent relationships or correlations between the APIs represented as nodes of the graph. Weights can account for a determined likelihood of success for a path between two adjacent APIs as depicted in the graph. A higher weighted edge connection indicates a valid or preferred path exists while a limited connection indicates a possible path and a non-connection (represented as a dotted line association in FIG. 5) represents the path is not a valid sequence path. Accordingly, API processing services 340 may use this information as a possible scoring system to select the most desired path between APIs selected from the set of all available APIs as represented in API probability graph 330. Thus NLP intent processing logic/modules 346 may be able to select an appropriate set of APIs to perform functions consistent with the intent of a natural language command. In an API probability graph 330, APIs may have different weights based on direction of connection in the directed graph. For example, it may be valid (or even preferred) for API 1 to call API 2, but API 2 may not validly ever call API 1 (i.e., a non-connection from API 2 to API 1).

Architecture 300 can include memory/data stores 315 for storing and/or retrieving acquired data 336, generated probability data 335, and/or API probability graph 330. Memory/data stores 315 can include any type of memory known (e.g., volatile memory, non-volatile memory, etc.). Each of data 336, 335, and 330 can be generated, processed, and/or captured by the other components in architecture 300. For example, acquired data 336, generated probability data 335, and/or API probability graph 330 represents the result of processing data generated by, captured by, processed by, or associated with one or more user devices 355, network based APIs 360, network connected devices 350, and/or processing unit(s) 345, etc. Architecture 300 can also include a memory controller (not shown), which includes at least one electronic circuit that manages data flowing to and/or from memory 315 The memory controller can be a separate processing unit or integrated in processing unit(s) 345.

Architecture 300 can include network-connected devices 350, which may include any number of hardware devices that communicate via any of the communication mechanism(s) 310 and are capable of being controlled via network communication. Examples of devices 350 include, but are not limited to, IoT devices, laptop computers, desktop computers, wearables, servers, vehicles, and any type of programmable device or computing system.

For one embodiment, architecture 300 includes communication mechanism(s) 310. Communication mechanism(s) 310 can include a bus, a network, or a switch. When communication mechanism(s) 310 includes a bus, communication mechanism(s) 310 include a communication system that transfers data between components in architecture 300, or between components in architecture 300 and other components associated with other systems (not shown). As a bus, communication mechanism(s) 310 includes all related hardware components (wire, optical fiber, etc.) and/or software, including communication protocols. For one embodiment, communication mechanism(s) 310 can include an internal bus and/or an external bus. Moreover, communication mechanism(s) 310 can include a control bus, an address bus, and/or a data bus for communications associated with architecture 300. For one embodiment, communication mecha-nism(s) 310 can be a network or a switch. As a network, communication mechanism(s) 310 may be any network such as a local area network (LAN), a wide area network (WAN) such as the Internet, a fiber network, a storage network, or a combination thereof, wired or wireless. When communication mechanism(s) 310 includes a network, components in architecture 300 do not have to be physically co-located. When communication mechanism(s) 310 includes a switch (e.g., a "cross-bar" switch), separate components in architecture 300 may be linked directly over a network even though these components may not be physically located next to each other. For example, two or more of processing unit(s) 345, communication mechanism(s) 310, memory 315, and network based APIs 360 are in distinct physical locations from each other and are communicatively coupled via communication mechanism(s) 310, which is a network or a switch that directly links these components over a network.

Monitoring of API Interaction Sequences (Non-Exhaustive Examples)

Figure 4:
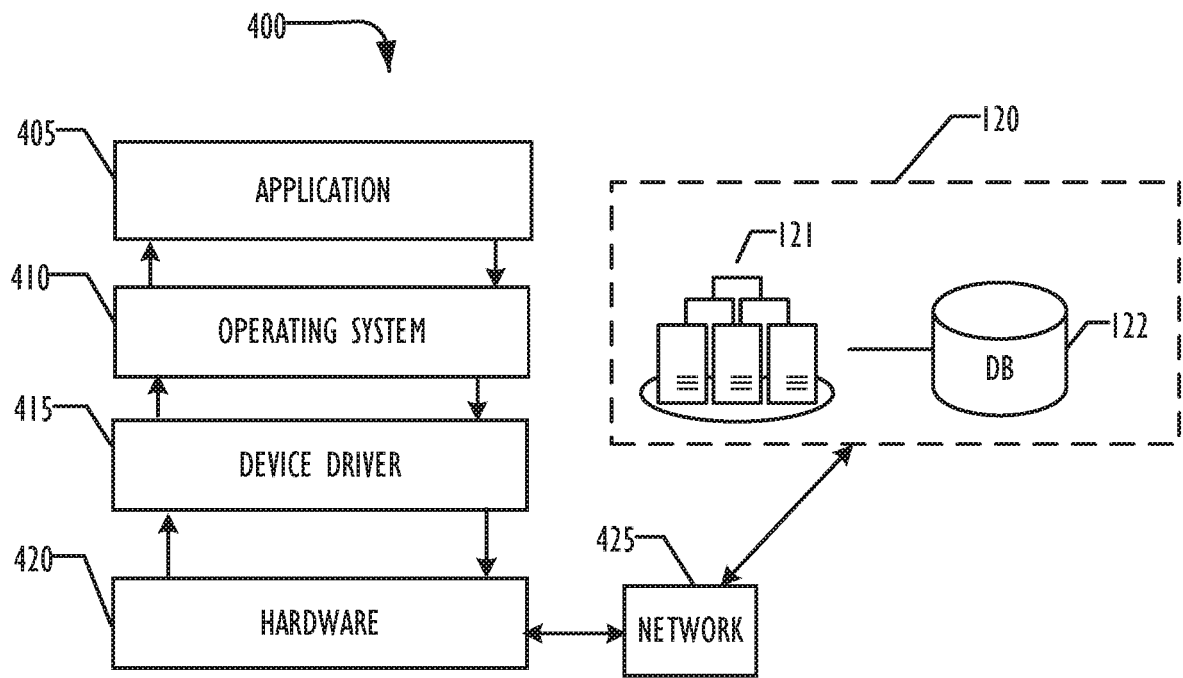
FIG. 4 illustrates views 400 and 450 to illustrate a layered model of a software/hardware stack communicatively coupled to a server configuration, according to one or more disclosed embodiments.
Figure 4:
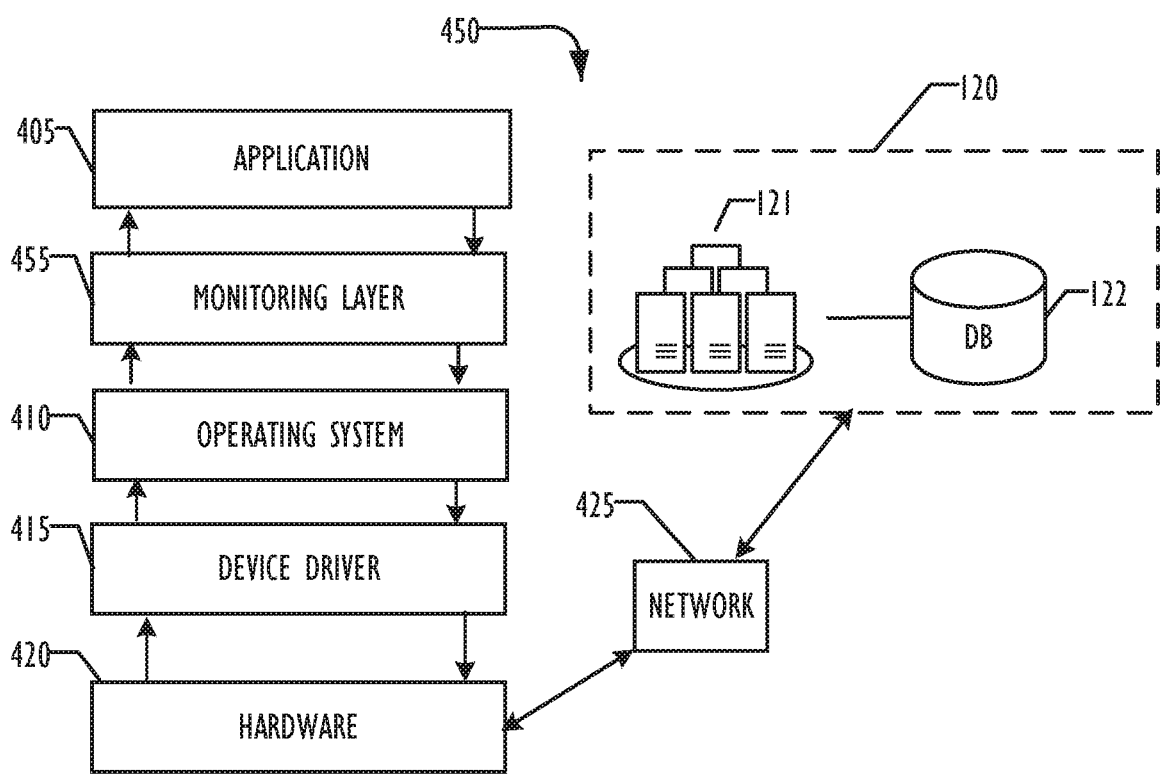

FIG. 4 shows two block diagrams (400 and 450) illustrating examples of a hardware and software stack, each in the form of a layered model, for use in explaining some methods of implementing monitoring hooks, according to one or more disclosed embodiments. Monitoring may be useful to build and maintain an API probability graph (330 and 500) because actual functional applications are performing the calls (rather than test generated call sequences). Monitoring a computer in functional use may provide detailed information about how APIs may be related to each other in API probability graph (330 and 500). Block diagram 400 includes layers depicting interaction points between different functional components of a computer implemented solution. Application layer 405 is depicted at the top of the layered model to indicate that it is "closest" to the user with respect to functionality. In typical operation, a user interacts with an application (as supported by the operating system) to introduce commands (e.g., natural language commands) for execution where the execution begins at application layer 405. The application, in turn, sends and receives commands and information to operating system layer 410. Operating system layer 410, as shown, sits between application layer 405 and device driver layer 415. Device driver layer 415 provides the interface between operating system layer 405 and hardware components represented by hardware layer 420. Hardware components may include input devices such as keyboards and mice for receiving user input, output devices such as traditional monitors and speakers, and input/output devices such as touch screen monitors, network interfaces (to communicate via network 425), disk controller cards, memory devices, etc. The layered model shown in block diagram 400 represents a traditional logical representation of a software/hardware stack and may not be totally accurate for all implementations. For example, some portions of device drivers may more accurately reside within operating system layer 410 depending on how the operating system was implemented. In any case, block diagram 400 represents a conceptual model of how different components of a processing device may be configured to support application execution. As further illustrated in block diagram 400, network 425 (which may include any of networks 110) may be used to communicatively couple a processing device with server configuration 120. In this example, API calls and sequences may be monitored by altering components at any layer of the model. For example, the hardware could be modified to provide additional events directed to a monitoring infrastructure along with traditionally supplied events. Similarly, the device driver or operating system may be modified to include additional functionality directed to support disclosed embodiments of API monitoring and analysis. Finally, each application may be adapted to include additional logic to support disclosed embodiments of API monitoring and analysis. While all of these implementations are possible, they represent varying degrees of "cost" in both development time and possible processing device performance. Accordingly, some combination of alterations at different layers may be desirable. Further, an example implementation of monitoring capabilities potentially requiring no changes to other layers is illustrated by block diagram 450 illustrated below. Again, a preferred embodiment may include combinations of the disclosed possible implementations.

Continuing with FIG. 4, block diagram 450 illustrates a variation to the layered model explained above. In particular, block diagram 450 includes monitoring layer 455 implemented between application layer 405 and operating system layer 410. Introduction of monitoring layer 455, as illustrated, may represent an embodiment where minimal changes (if any) are required at other layers of the model. It may even be possible to implement monitoring layer 455 without application layer 405 or operating system layer 410 having to change their method of operation with adjacent layers of the model. Monitoring layer 455 could be configured to identify any pertinent interactions (e.g., API calls and their sequence) between application layer 405 and operating system layer 410. For any pertinent interactions, monitoring layer 455 could initiate transmission of information via network 425 to server configuration 120. Once analyzed and processed, information pertaining to API paths could be added to API probability graph (e.g., 330 or 500).

API Directed Graph Model

Figure 5:
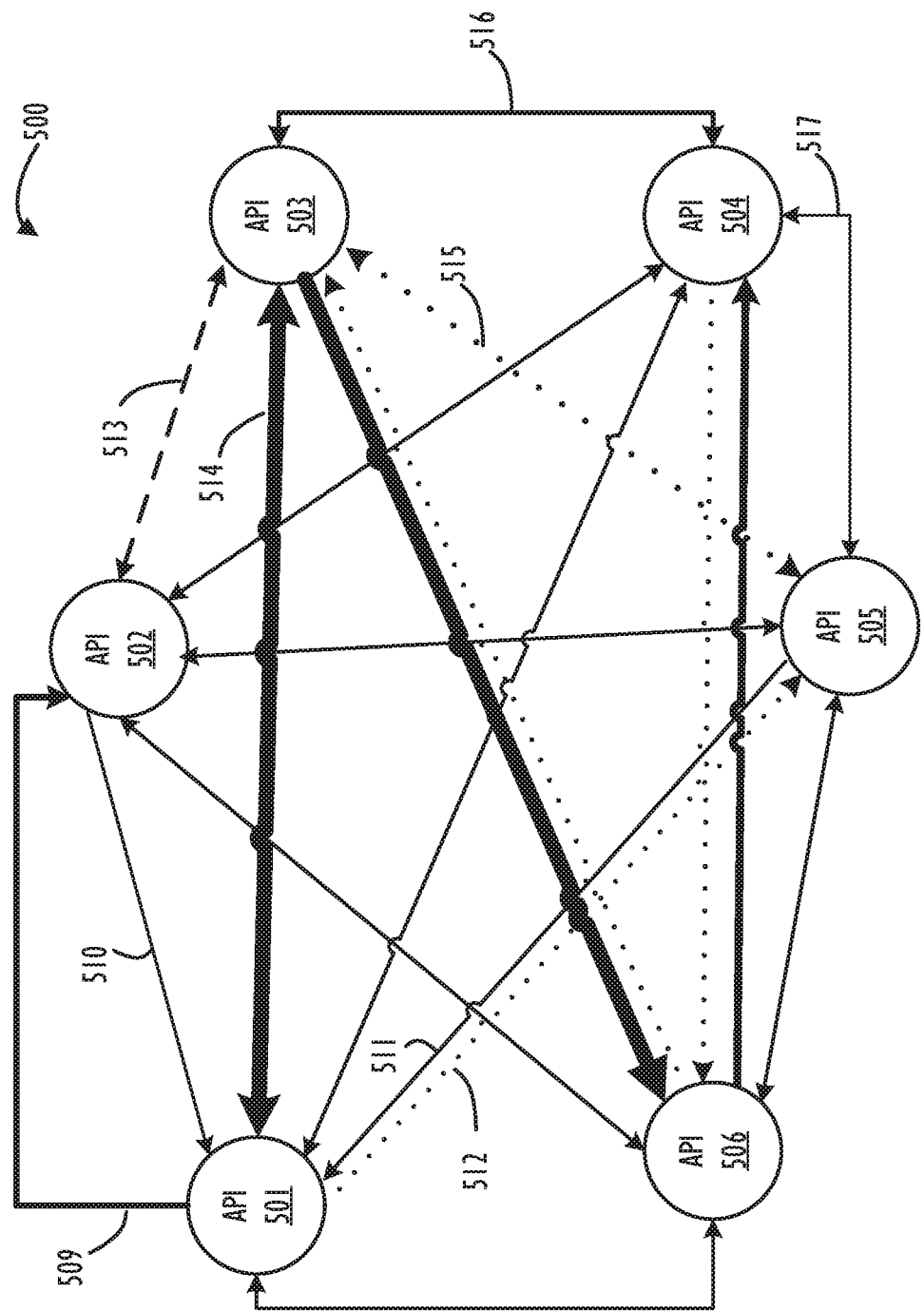
FIG. 5 illustrates an example directed graph model 500 that may be used to maintain relationships and functionality paths between APIs within a given computing environment, according to one or more disclosed embodiments.

Referring now to FIG. 5, a 2D graphical approximation of an exemplary API directed graph 500 associated with a set of APIs is illustrated. As shown, API directed graph 500 includes one cluster six APIs 501-506. As used herein, an "API cluster," a "cluster of APIs," and their variations refers to a group of at least two APIs that is based on a relationship between the set of APIs (e.g., their functional interoperability). In FIG. 5, each of the APIs 501-506 in the API directed graph 500 represents an individual path/connection (i.e., edges) to represent a functional relationship between individual APIs. It is to be appreciated that there can be any number of APIs (i.e., at least two APIs) in API directed graph 500 and that API directed graph 500 can include any number of contexts. In practice, it is anticipated that there may be a very large number of APIs and in some embodiments multiple APIs may be grouped together in a pre-defined sequence and represented in API directed graph 500 as a single node.

API directed graph 500 includes several uni-directional or bi-directional edges between the nodes (e.g., APIs) 501-506. Each of these edges represents a correlation between its pair of nodes (e.g., APIs). Furthermore, there can be different types of edges based on a degree of correlation between a pair of nodes. There can be represented a relationship between two nodes as a single bi-directional edge (e.g., 514) or two independent uni-directional edges (e.g., A single bi-directional edge represents that the same probability relationship (edges 513, 514, 515, 516) exists between both APIs. That is, as shown by edge 514 it is just as likely that API 501 will call API 505 as it is that API 505 will call API 501. Edges 509 and 510 represent a potential difference in likelihood of two APIs that might call each other. Edge 509 is a heavier weight than edge 510 to indicate that API 501 is more likely to call API 502 than it is that API 502 would call API 501. It is however possible for API 502 to call API 501. Edges 511 and 512 represent two different "one-way relationships" between two APIs. Edge 511 represents that API 505 may call API 501 but edge 512 (shown as a dotted line) represents that there is no known valid way for API 501 to call API 505. Edge 513 (shown as a dashed line) represents that the relationship between API 502 and API 503 is not known at all. This may occur when a new API is introduced into the system (e.g., a new web service is published), for a path that has not been tested yet, or for a path not yet identified by monitoring. Edge 515 represents that API 503 may not call API 505 and that API 505 may not call API 503. Clearly, there can only be a single relationship for a given direction between the two same APIs within API directed graph 500. API directed graph 500 is illustrative only as real life systems would include many more APIs and relatively few bi-directional relationships that have the same weight.

As mentioned briefly above, each of the edges can be weighted to show a degree of correlation between its pair of nodes. Correlations between the nodes 501-506 (i.e., the nodes 501-506 representing individual APIs) in API directed graph 500 can be based on acquired data (e.g., 336 of FIG. 3), relationships of APIs based on definitional data (block 725 of FIG. 7A), and/or generated probability data (335 of FIG. 3). For one embodiment, one or more of acquired data, relationships, and/or generated probability data is valued and combined to form the edge weight. For example, and as illustrated in FIG. 3, the edges between one or more pairs of APIs having differing thicknesses to show that the weighting of the correlations can be different and different based on the direction of the relationship.

Figure 6:
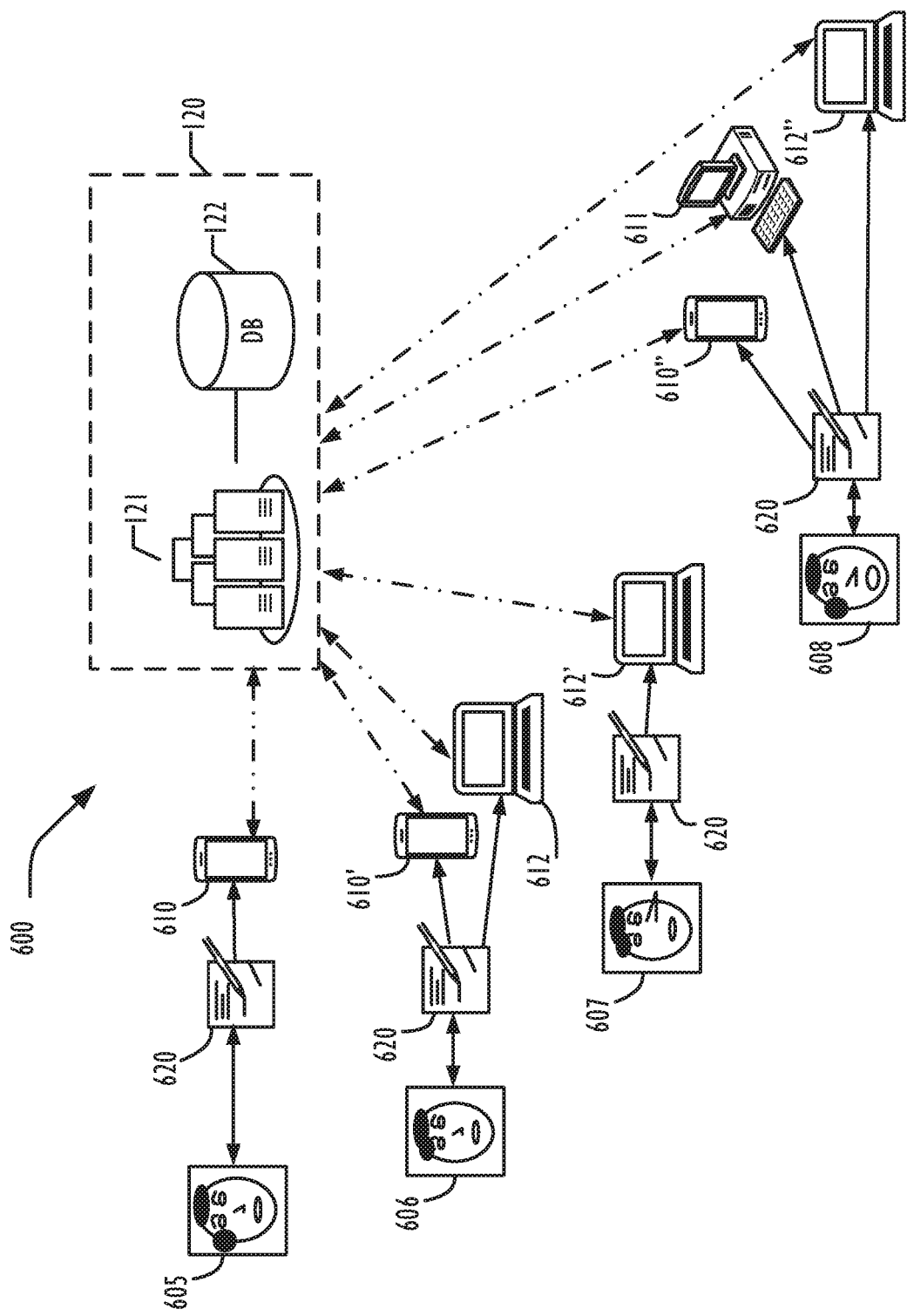
FIG. 6 illustrates multiple users and end-user devices communicatively coupled to a server configuration 120 that may be configured to provide an API processing service 340, according to one or more disclosed embodiments.

FIG. 6 illustrates, in block diagram 600, multiple users with end-user devices communicatively coupled to a server configuration 120 that may be configured to interact with an API processing service 340, according to one or more disclosed embodiments. Different examples of users' devices and groups of devices for a single user are shown. Beginning with user 605 a natural language command may be provided via interface 620 (which may be a digital assistant (e.g., IPA) or an application program) and processed by device 610. Device 610 may have a local copy of a directed API graph (see FIG. 5 above) or portion thereof to assist in parsing and processing the natural language command. Alternatively, the natural language command may be sent to server configuration 120 that contains an API processing service 340. In either case, an API probability graph and its information may be used to create an order of APIs to perform the requested function(s). Note that applications that are run on device 610 that are not using a natural language interface may also be monitored and their information with regard to API sequencing provided to server configuration 120. As an example, user 605 may "tell" device 610 to "send a picture taken on the device at noon today to Joe." This would cause the system to prepare a set of APIs to identify the picture, identify Joe (presumably from contacts), and identify a method to send the picture (e.g., email or SMS). Accordingly, API processing service 340 may supply the appropriate APIs in the appropriate order to allow device 610 to execute them in that order to have the picture sent. If everything performs properly, API processing service 340 may note success. However, if user 605 must alter the proposed sequence to achieve the desired intent, the alteration may be provided to API processing service 340 to adjust its information to affect future processing of this or similar command requests. User 606 is shown interacting with interface 620 on their set of personal devices 610' and 612. User's 607 and 608 are each shown interacting with interface 620 on their respective devices 612', 610", 611, and 612". In this manner, API processing service 340 executing on server configuration 120 may learn from both what each individual user does to correct API sequences but may also learn from monitoring normal applications. As a result, a model as maintained in a directed API graph 500 (or API probability graph 330) may improve over time and assist in natural language command processing.

Figure 7A:
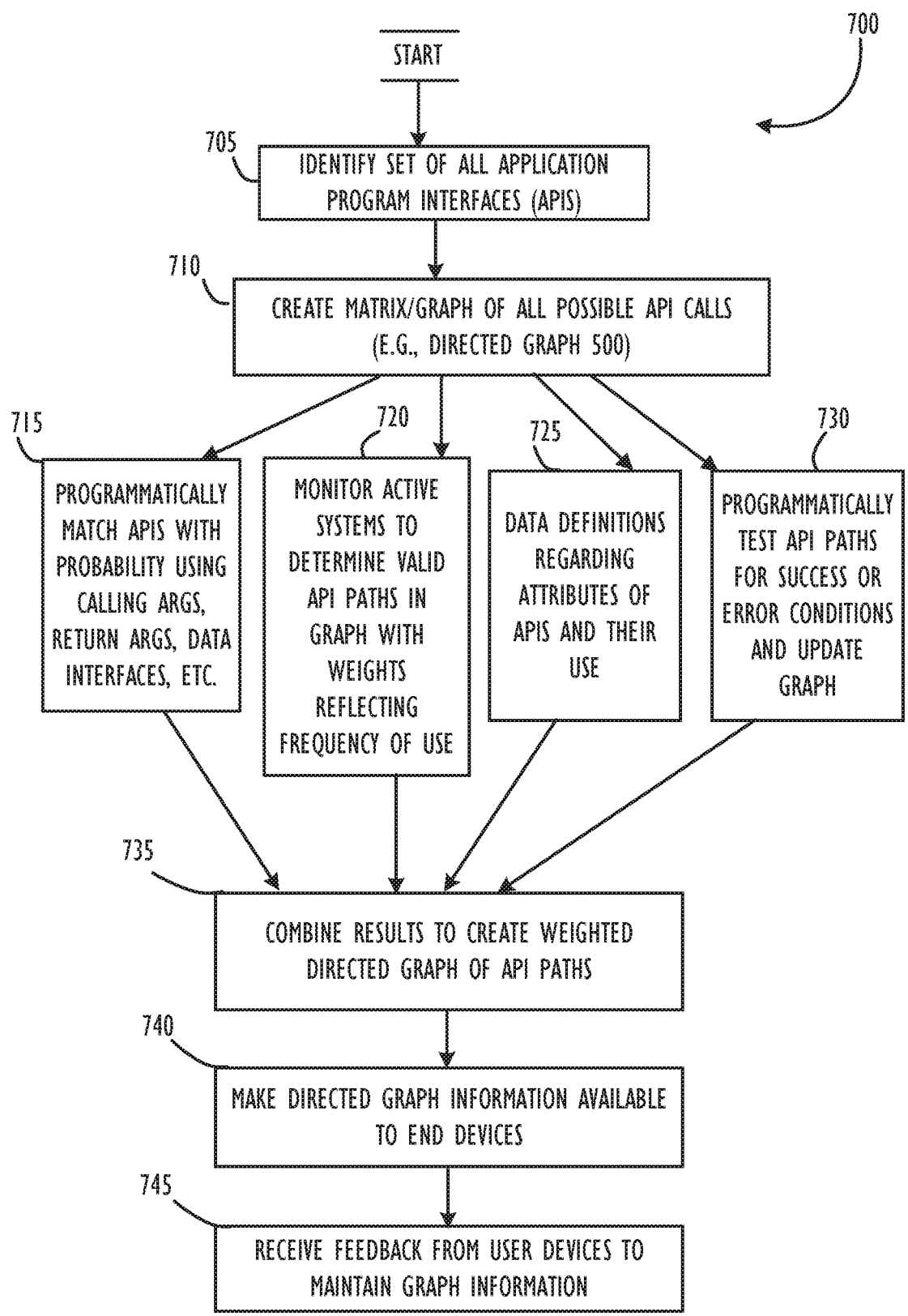
FIGS. 7A-B illustrate flowcharts of operation 700 representing one possible method to build and maintain an API directed graph model 500 and operation 750 representing one possible method of use for an API directed graph model 500, according to one or more disclosed embodiments.
Figure 7B:
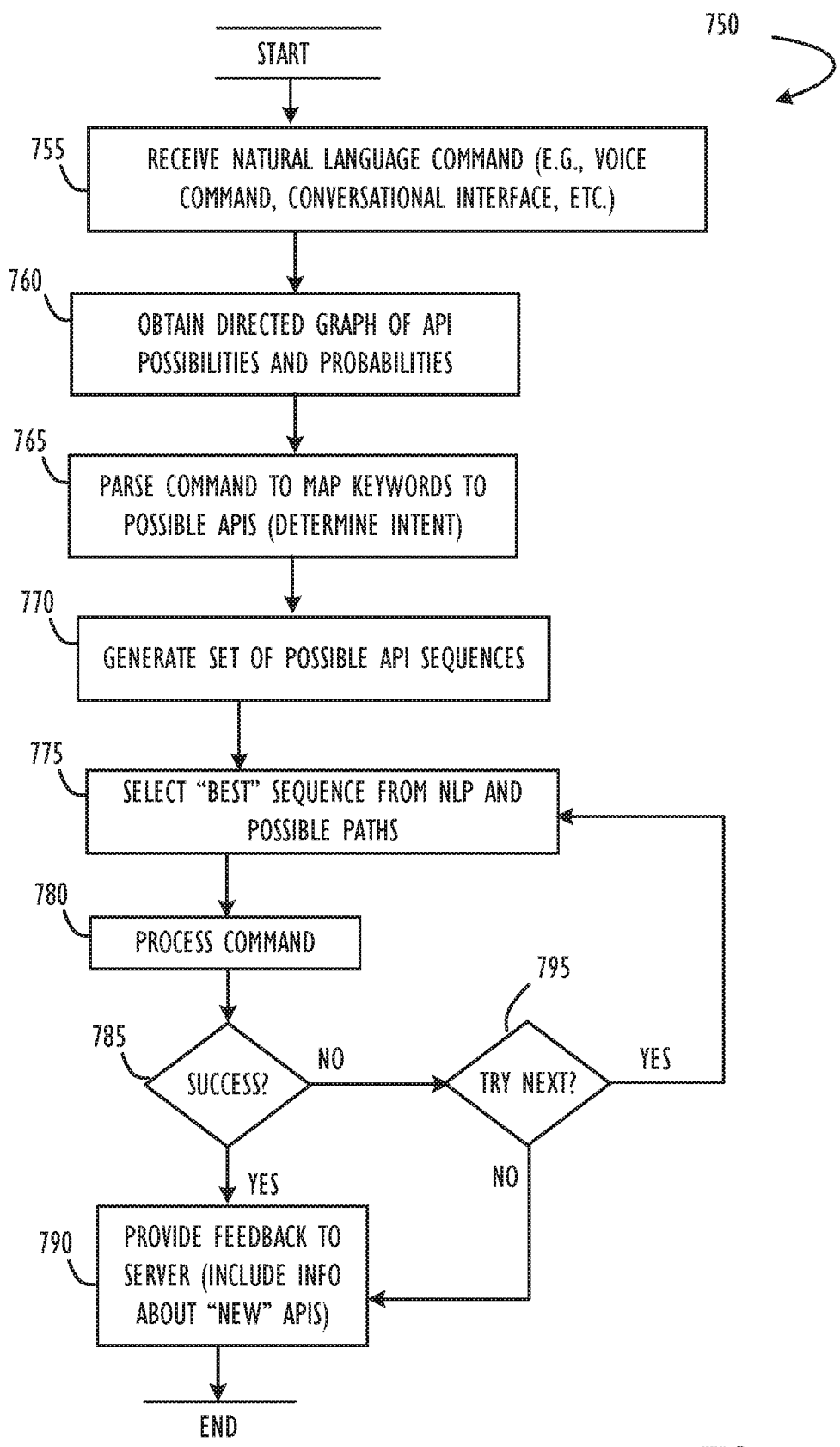

Referring now to FIGS. 7A-B, a flowchart of operation 700 represents one possible method to build and maintain an API directed graph model 500. Operation 750 represents one possible method of use for an API directed graph model 500, according to one or more disclosed embodiments. Operation 700 begins at block 705 where a set of all APIs known to exist within a system are identified. At block 710, a matrix or graph model (e.g., API directed graph 500, API probability graph 330) is initialized to be used to maintain relationships between APIs and assign probabilities of possible paths connecting each API to other available APIs. Blocks 715, 720, 725, and 730 represent processing that may be performed in parallel to assist in creating/maintaining a graph model. Block 715 indicates that APIs may be programmatically matched with each other based on their calling arguments, return arguments, or exposed data interfaces. In this manner APIs that work with like information may be grouped together as they may be more likely to have a functional relationship between them. That is, if the input to API 1 matches the outputs of API 2, then API 2 may likely have a valid reason to be called sequentially after API 1. Block 720 indicates that systems may be monitored (e.g., user systems of FIG. 6) to determine API paths that are used during their normal operation. Normal operation may include reacting to natural language commands as well as other command interfaces (e.g., touchscreen, keyboard, etc.). In this manner, it may be learned which APIs are related to each other and their sequence of relations such that this information may be provided as input to API directed graph 500. Block 725 indicates that definitional data may be used to add information to API directed graph 500. That is, pre-defined data may be input to the API processing service 340 to identify information about how APIs interrelate and their sequence probabilities, for example. Block 730 indicates that a system such as server configuration 120 may create test programs to execute possible API paths and determine if the proposed sequences finish to completion or cannot complete because of some error condition. In either case, information determined from generated test programs may represent generated data 335 that may be further used by API processing service 340. Block 735 indicates that each of blocks 715-730 produce results that may be combined to create a directed graph of API paths and associated weighting for each path segment. Block 740 indicates that API directed graph information may be made available to end user devices for use in processing natural language commands, for example. Block 745 indicates that end user devices may provide feedback to API processing service 340 to maintain and further refine graph information about API relationships.

Turning to FIG. 7B, operation 750 illustrates one possible method of use for an API directed graph model 500. For example, by API processing service 340 on server configuration 120. Operation 750 begins at block 755 where a natural language command (e.g., a voice command or a command from a "conversational" interface) is received. Block 760 indicates that a directed graph of API possibilities and probabilities (e.g., API directed graph 500 or portion thereof) may be obtained. Block 765 indicates that the natural language command may be parsed to identify keywords and match the keywords with one or more APIs in an API sequence to match the user's intent. For example, generate a command sequence to fulfill the user's requested action as shown at block 770. Block 775 indicates that the system (e.g., API processing service 340) may select an API sequence using an API directed graph 500 that "best" matches the NLP processing possible paths. A "best" match indicates that weights on edges of API directed graph 500 are taken into account. Block 780 indicates that a first proposed command sequence is processed (e.g., on a user device). Decision 785 determines if there is successful execution and may receive feedback from a user to identify success. If not, the NO prong of decision 785, flow continues to decision 795 where it is determined if another try should be attempted. If so, the YES prong of decision 785, flow returns to block 775 where another selection of "best" from remaining available options may be selected. However, if there are no other high probability options available or a retry threshold has been reached, for example. It may be determined that no further attempts are to be made for this command (the NO prong of decision 795) and flow continues to block 790 where feedback regarding failure may be provided to the server. However, if the command is successful, the YES prong of decision 785, flow continues to block 790 where information about the successful command (and any adjustments made by the user) may be returned to the server to provide feedback to further tune the model (e.g., API directed graph 500).

Examples of Possible Further Embodiments

The following examples pertain to further embodiments.

Example 1 is a computer-implemented method where the methods includes the acts of creating a graphical representation of relationships between a set of available application program interface (API) calls available to a computer system; determining actual or perspective paths through the graphical representation based on sequences of calls between each API of the set of available API calls; assigning a path metric to each of the determined and perspective paths, the path metric indicating, in part, a likelihood of success for the each path; and providing at least a portion of the graphical representation of relationships to an end user device, wherein the end user device utilizes the at least a portion of the graphical representation of relationships and corresponding path metrics to determine a response to a natural language command.

Example 2 expands from example 1 and includes wherein determining the actual or perspective paths comprises receiving information from the end user device representative of monitoring performed on the end user device to identify actual API sequences that have taken place on the end user device.

Example 3 expands from example 2 and includes receiving information from the end user device and a plurality of other devices representative of monitoring performed on each respective device to identify actual API sequences that have taken place on the each respective device; and updating the graphical representation of relationships to adjust the path metric assigned to the each path corresponding to the actual API sequences that have taken place on the each respective device.

Example 4 expands from example 1, wherein determining the actual or perspective paths comprises receiving information from the end user device representative of programmatically testing API paths for success or error conditions.

Example 5 expands from example 1, wherein determining the actual or perspective paths comprises receiving information representative of definitional data describing attributes of APIs and their use.

Example 6 expands from example 1, wherein determining the actual or perspective paths comprises programmatically matching APIs with a probability of success based on calling arguments of each API, return arguments of each API, or data interfaces used by each API.

Example 7 expands from example 1 and includes receiving feedback from the end user device representative of failure of processing the natural language command and a sequence of API calls resulting in failure; and updating the graphical representation of relationships to adjust the path metric assigned to the each path corresponding to the sequence of API calls resulting in failure.

Example 8 expands from example 1 and includes identifying a newly available API that was not available at the time of creating the graphical representation of relationships; and adding information about the newly available API to the graphical representation of relationships.

Example 9 expands from example 8, wherein the newly available API is a web service API.

Example 10 expands from example 1, wherein the graphical representation of relationships between the set of available API calls includes an indication that a first API may never call a second API.

Each of the above examples may also be implemented as instructions stored on a computer readable medium to cause a computer system to perform the method or may be implemented in a computer system to perform the method associated with any combination of the above examples.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. References to numbers with one or more "prime" symbols (i.e., single quote) represent that the same type of element is referred to but it may be configured in a different manner. For example, if element A represents a tablet or cell phone then element A' may represent a tablet or cell phone associated with a different user than the tablet or cell phone represented by element A. That is, both elements A, and A' represent cell phones but they may be different instances of a cell phone and may be different in hardware or software characteristics. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A computer-implemented method, comprising:

monitoring, by a monitoring layer of a layered model of a hardware stack and a software stack, application program interface (API) sequences for a set of API calls from interactions between an application layer of an application on a plurality of devices and an operating system layer of the plurality of devices;

detecting a user interaction with the application on an end user device, wherein the user interaction comprises at least one of a user command or a user query for a natural language processing (NLP) intent classification system of the application;

determining acquired data and generated data for the set of API calls available to a computer system usable with the application, wherein the acquired data comprises the monitored API sequences performed by the NLP intent classification system, and wherein the generated data comprises probabilistic determinations of potentially successful API sequences performable by the NLP intent classification system;

generating, based on the acquired data and the generated data, a graphical representation comprising individual clusters of nodes connected by edges for relationships between APIs in the set of API calls available to the computer system;

determining one or more paths in the graphical representation of relationships based on one or more relationships between two or more APIs in the set of API calls, wherein each of the one or more relationships between the two or more APIs is weighted to indicate a degree of correlation for each relationship based on the acquired data and the generated data;

assigning a path metric to each of the one or more determined paths, the path metric indicating, in part, a likelihood of success for each of the one or more determined paths;

providing at least a portion of the graphical representation of relationships to the end user device with an NLP intent response to the user interaction based on the one or more determined paths and the assigned path metrics, wherein the NLP intent response is associated with a user intent from the at least one of the user command or the user query determined by the NLP intent classification system;

receiving feedback comprising one or more user inputs from the end user device to the at least the portion of graphical representation of relationships;

determining to adjust, for the graphical representation of relationships, the one or more paths associated with the one or more relationships between the two or more APIs in the set of API calls, wherein the determining to adjust comprises:

adjusting, based on a machine learning technique and the feedback, one or more of the assigned path metrics, generating a potential API path using an AI model based on the set of API calls, the one or more determined paths, and the adjusted one or more of the assigned path metrics, executing a test program of the potential API path for the user interaction based on the adjusted one or more of the assigned path metrics, and determining that the potential API path results in a finished sequence of events or an error condition;

updating the one or more determined paths with the potential API path;

configuring the NLP intent classification system to execute the potential API path using the set of API calls for processing the user interaction and returning the NLP intent response;

executing, based on the NLP intent response to the user interaction, a sequence of API calls from the set of API calls using the graphical representation of relationships of the set of paths including the potential API path; and providing the NLP intent response in the application on the end user device based on the executed sequence.

2. The computer-implemented method of claim 1, wherein the at least a portion of the graphical representation of relationships provided to the end user device and corresponding path metrics are used to determine a response to a natural language command.

3. The computer-implemented method of claim 1, further comprising:

updating the graphical representation of relationships based on one of the one or more determined paths that have taken place on the end user device and one or more other devices.

4. The computer-implemented method of claim 2, further comprising:

receiving an indication of a failure of processing the natural language command and a sequence of API calls resulting in the failure; and updating the graphical representation of relationships based on the sequence of API calls resulting in the failure.

5. The computer-implemented method of claim 1, wherein determining the one or more paths comprises:

receiving information from the end user device representative of programmatically testing API paths for completion of the NLP intent response to the user interaction;

receiving information representative of definitional data describing attributes of APIs and their use; and programmatically matching APIs with a probability of success based on calling arguments of each API, return arguments of each API, or data interfaces used by each API.

6. The computer-implemented method of claim 1, further comprising:

identifying a newly available API that was not available at the time of creating the graphical representation of relationships; and adding information about the newly available API to the graphical representation of relationships.

7. The computer-implemented method of claim 1, wherein the graphical representation of relationships between the set of API calls includes an indication that a first API does not call a second API.

8. A non-transitory computer readable medium comprising computer executable instructions stored thereon to cause one or more processing units to:

monitor, by a monitoring layer of a layered model of a hardware stack and a software stack, application program interface (API) sequences for a set of API calls from interactions between an application layer of an application on a plurality of devices and an operating system layer of the plurality of devices;

detect user interaction with the application on an end user device, wherein the user interaction comprises at least one of a user command or a user query for a natural language processing (NLP) intent classification system of the application;

determine acquired data and generated data for the set of API calls available to a computer system usable with the application, wherein the acquired data comprises the monitored API sequences performed by the NLP intent classification system, and wherein the generated data comprises probabilistic determinations of potentially successful API sequences performable by the NLP intent classification system;

generate, based on the acquired data and the generated data, a graphical representation comprising individual clusters of nodes connected by edges for relationships between APIs in the set of API calls available to the computer system;

determine one or more paths through the graphical representation of relationships based on one or more relationships between two or more APIs in the set of available API calls, wherein each of the one or more relationships between the two or more APIs is weighted to indicate a degree of correlation for each relationship based on the acquired data and the generated data;

assign a path metric to each of the one or more paths, the path metric indicating, in part, a likelihood of success for each of the one or more paths;

provide at least a portion of the graphical representation of relationships to the end user device with an NLP intent response to the user interaction based on the one or more determined paths and the assigned path metrics, wherein the NLP intent response is associated with a user intent from the at least one of the user command or the user query determined by the NLP intent classification system;

receive feedback comprising one or more user inputs from the end user device to the at least the portion of graphical representation of relationships;

determine to adjust, for the graphical representation of relationships, the one or more paths associated with the one or more relationships between the two or more APIs in the set of API calls, wherein determining to adjust comprises:

adjusting, based on a machine learning technique and the feedback, one or more of the assigned path metrics, generating a potential API path using an AI model based on the set of API calls, the one or more determined paths, and the adjusted one or more of the assigned path metrics, executing a test program of the potential API path for the user interaction based on the adjusted one or more of the assigned path metrics, and determining that the potential API path results in a finished sequence of events or an error condition;

update the one or more determined paths with the potential API path;

configure the NLP intent classification system to execute the potential API path using the set of API calls for processing the user interaction and returning the NLP intent response;

execute, based on the NLP intent response to the user interaction, a sequence of API calls from the set of API calls using the graphical representation of relationships of the set of paths including the potential API path; and provide the NLP intent response in the application on the end user device based on the executed sequence.

9. The non-transitory computer readable medium of claim 8, wherein the end user device utilizes the at least a portion of the graphical representation of relationships and corresponding path metrics to determine a response to a natural language command.

10. The non-transitory computer readable medium of claim 8, wherein the instructions that cause the one or more processing units to determine the one or more paths comprise instructions that further cause the one or more processing units to:

update the graphical representation of relationships based on one of the one or more paths that have taken place on the end user device and one or more other devices.

11. The non-transitory computer readable medium of claim 9, wherein the instructions that cause the one or more processing units to determine the one or more paths comprise instructions that further cause the one or more processing units to:

receive an indication of a failure of processing the natural language command and a sequence of API calls resulting in failure; and update the graphical representation of relationships based on the sequence of API calls resulting in the failure.

12. The non-transitory computer readable medium of claim 8, wherein the instructions that cause the one or more processing units to determine the one or more paths comprise instructions that further cause the one or more processing units to:

receive information from the end user device representative of programmatically testing API paths for completion of the NLP intent response to the user interaction;

receive information representative of definitional data describing attributes of APIs and their use; and programmatically match APIs with a probability of success based on calling arguments of each API, return arguments of each API, or data interfaces used by each API.

13. The non-transitory computer readable medium of claim 8, wherein the instructions that cause the one or more processing units to determine the one or more paths comprise instructions that further cause the one or more processing units to:

identify a newly available API that was not available at the time of creating the graphical representation of relationships; and add information about the newly available API to the graphical representation of relationships, wherein the newly available API is a web service API.

14. The non-transitory computer readable medium of claim 8, wherein the graphical representation of relationships between the set available of API calls includes an indication that a first API does not call a second API.

15. An apparatus, comprising:

a network communications interface;

a memory; and one or more processing units, communicatively coupled to the memory and the network communications interface, wherein the memory stores instructions configured to cause, when executed, the one or more processing units to:

monitor, by a monitoring layer of a layered model of a hardware stack and a software stack, application program interface (API) sequences for a set of API calls from interactions between an application layer of an application on a plurality of devices and an operating system layer of the plurality of devices;

detect a user interaction with the application on an end user device, wherein the user interaction comprises at least one of a user command or a user query for a natural language processing (NLP) intent classification system of the application;

determine acquired data and generated data for the set of API calls available to a computer system usable with the application, wherein the acquired data comprises the monitored API sequences performed by the NLP intent classification system, and wherein the generated data comprises probabilistic determinations of potentially successful API sequences performable by the NLP intent classification system;

generate, based on the acquired data and the generated data, a graphical representation comprising individual clusters of nodes connected by edges for relationships between APIs in the set of API calls available to the computer system;

determine a plurality of paths through the graphical representation based on a plurality of relationships between two or more APIs in the set of API calls, wherein each of the plurality of relationships between the two or more APIs is weighted to indicate a degree of correlation for each relationship based on the acquired data and the generated data;

assign a path metric to each of the plurality of paths, the path metric indicating, in part, a likelihood of success for each of the plurality of paths;

provide at least a portion of the graphical representation of relationships to the end user device with an NLP intent response to the user interaction based on the one or more determined paths and the assigned path metrics, wherein the NLP intent response is associated with a user intent from the at least one of the user command or the user query determined by the NLP intent classification system;

receive feedback comprising one or more user inputs from the end user device to the at least the portion of graphical representation of relationships;

determine to adjust, for the graphical representation of relationships, the one or more paths associated with the one or more relationships between the two or more APIs in the set of API calls, wherein determining to adjust comprises:

adjusting, based on a machine learning technique and the feedback, one or more of the assigned path metrics, generating a potential API path using an AI model based on the set of API calls, the one or more determined paths, and the adjusted one or more of the assigned path metrics, executing a test program of the potential API path for the user interaction based on the adjusted one or more of the assigned path metrics, and determining that the potential API path results in a finished sequence of events or an error condition;

update the one or more determined paths with the potential API path;

configure the NLP intent classification system to execute the potential API path using the set of API calls for processing the user interaction and returning the NLP intent response;

execute, based on the NLP intent response to the user interaction, a sequence of API calls from the set of API calls using the graphical representation of relationships of the set of paths including the potential API path; and provide the NLP intent response in the application on the end user device based on the executed sequence.

16. The apparatus of claim 15, wherein the instructions further cause the one or more processing units to:

update the graphical representation of relationships based on one of the plurality of paths that have taken place on the end user device and one or more other devices.

17. The apparatus of claim 15, wherein the instructions further cause the one or more processing units to:

receive an indication of a failure of processing the natural language command and a sequence of API calls resulting in failure; and update the graphical representation of relationships based on the sequence of API calls resulting in the failure.

18. The apparatus of claim 15, wherein the instructions further cause the one or more processing units to:

receive information from the end user device representative of programmatically testing API paths for completion of the NLP intent response to the user interaction;

receive information representative of definitional data describing attributes of APIs and their use; and/or programmatically match APIs with a probability of success based on calling arguments of each API, return arguments of each API, or data interfaces used by each API.

19. The apparatus of claim 15, wherein the instructions further cause the one or more processing units to:

identify a newly available API that was not available at the time of creating the graphical representation of relationships; and add information about the newly available API to the graphical representation of relationships, wherein the newly available API is a web service API.

20. The apparatus of claim 15, wherein the graphical representation of relationships between the set available of API calls includes an indication that a first API does not call a second API.

* * * * *